Aug. 18, 1953

C. L. KELLY 2,648,946

HAY RAKE

Filed April 21, 1952

INVENTOR.
Charles L. Kelly
BY
Martin E Anderson
ATTORNEY

Aug. 18, 1953     C. L. KELLY     2,648,946
HAY RAKE

Filed April 21, 1952     2 Sheets-Sheet 2

INVENTOR.
Charles L. Kelly
BY
Martin E. Anderson
ATTORNEY

Patented Aug. 18, 1953

2,648,946

UNITED STATES PATENT OFFICE 2,648,946

HAY RAKE

Charles L. Kelly, Denver, Colo.

Application April 21, 1952, Serial No. 283,280

4 Claims. (Cl. 56—385)

1

This invention relates to improvement in hay rakes.

On farms and ranches, especially on dairy farms and cattle ranches it is customary to raise a large amount of hay and for this crop various kinds of machines are employed. It is customary to rake the hay into windrows for drying and curing.

Hay rakes of various kinds have been made and sold some of which have been designed more particularly for use with horses and others designed for use with tractors.

It is the object of this invention to produce a hay rake of an improved construction that shall be so designed that it can be manufactured at a moderate cost and be of a rugged construction.

Another object is to produce a hay rake formed from a plurality of substantially identical sections that can be assembled on a shaft to produce a rake of a width equal to the combined width of any number of sections.

A still further object is to produce a rake having means for adjusting the ground pressure of the rake tines and with means permitting the rake tines to pass over obstructions such as rocks without injury.

The above and other objects that may appear as the description proceeds are attained by means of a construction and an arrangement of parts that will now be described in detail for which purpose reference will be had to the accompanying drawings in which the invention has been illustrated and in which Figure 1 is a front elevational view showing the rake tines in raking position.

Figure 1:
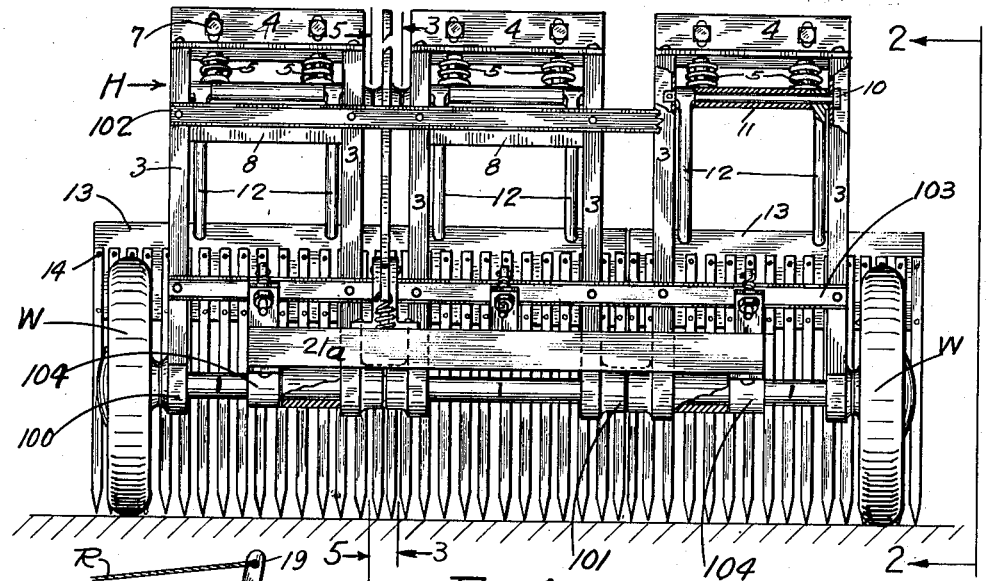

Referring now to the drawing, reference numeral 1 designates the axle on which the rake head assemblies are supported. Supporting wheels W are attached to the ends of the axle and mounted for rotation on anti-friction bearings.

2

Figure 3:
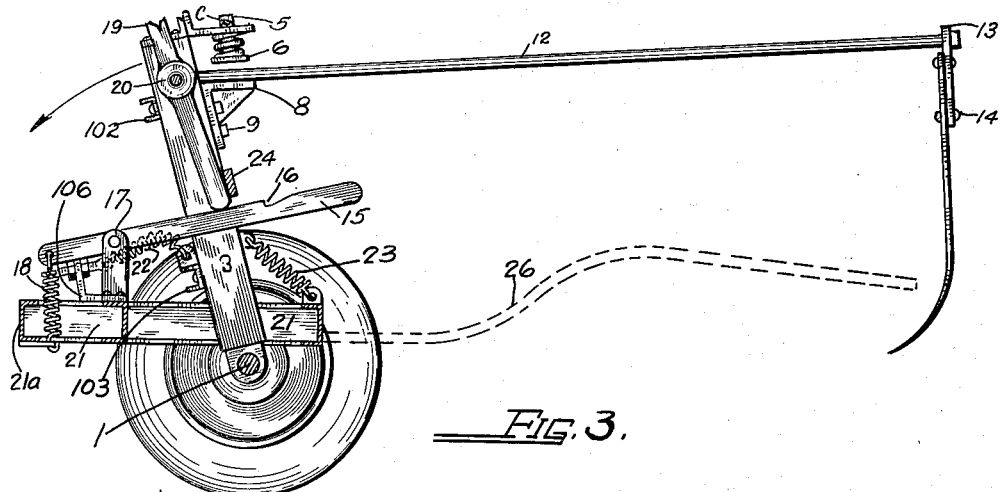
Figure 3 is a view taken on line 3—3, Figure 1, parts being shown in elevation and other parts in section.
Figure 4:
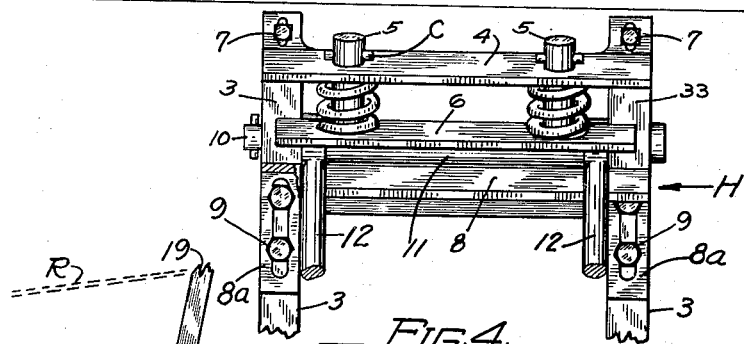
Figure 4 is a rear elevation of the upper end of a rake head section, looking in the direction of arrows 4—4 in Figure 2.

The rake head section assemblies have been designated in their entirety by reference letter H and are of identical size and construction. Each rake head consists of a frame having two parallel vertical members 3 that are connected at their upper ends by a tension bar 4 which is secured to them by bolts 7 which pass through elongated holes as shown in Figure 1. Bar 4 has two spaced openings through which the short bars 5 extend. Attached to the lower ends of bars 5 is a flat bar 6 that is urged downwardly by coil springs as shown in Figures 3 and 4.

Pins C or other equivalent means limit the downward movement of plate 6. Positioned below plate 6 and spaced therefrom is a plate 8 whose ends are provided with downwardly extending projections 8a which have slotted openings through which clamping bolts 9 extend. Plate 8 may be adjusted vertically along frame members 3 in a manner which is obvious from Figures 3 and 4. Associated with each rake head section is a tine rake assembly that is attached to the rake head frame by means of a pivot bar 10. The tine rake assembly is shown most clearly in Figure 6 and consists of a tubular sleeve 11 through which pivot bar 10 extends as shown in Figure 1. Pull rods 12 are welded or otherwise attached to the ends of sleeve 11. A tine group assembly comprising plate 13 and a number of resilient lines 25 attached thereto by bolts 14 is attached to the rear ends of pull rods 12. An inspection of Figures 2, 3 and 4 will show that the pull bars pass between the plates 6 and 8 and are permitted a limited amount of free movement. Bar 8 limits the downward movement of the rake teeth and the upward movement is resiliently limited by plate 6.

The lower ends of rake head assembly frame members 3 have enlarged portions 100 and 101 that are provided with openings through which axle 1 extends. It will be observed that parts 101 have laterally extending hub-like portions that serve to space the frame assemblies. The several rake head assemblies are connected by a bar 102 which is preferably a channel bar as shown in Figure 1 is secured to the front sides of frame members 3 and another channel bar 103 is secured to them nearer their lower ends.

A draw bar frame comprising two rearwardly extending end members 21 connected by spaced parallel members 21a extends forwardly from axle 1 to which the rear ends of members 21 are connected by sleeves 104. The axle does not rotate in sleeve 104 which may, if desired, be splined to the axle.

Figures 5, 6:
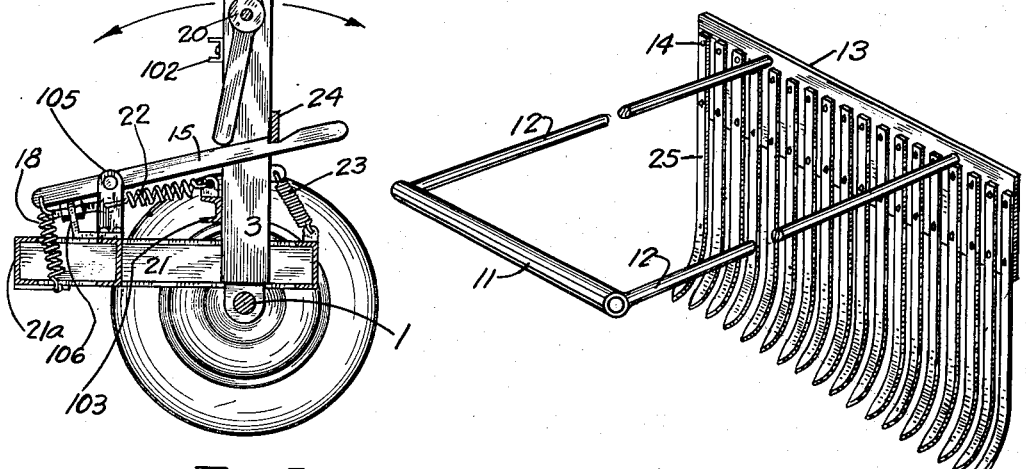
Figure 5 is a view taken on line 5—5 Figure 1 and shows some of the parts in section and others in elevation.
Figure 6 is a perspective view of the rake tine and pull rod assembly showing the same apart from the machine.

A flat bar 24 is attached to the rear of frame members 3 as shown in Figure 5 to which reference will now be had.

Bracket 105 is attached to the draw bar frame and has two spaced upwardly extending members between which the rake head stop bar 15 is positioned and to which it is attached by pivot 17. Bar 15 is positioned underneath bar 24 and has a notch 16 in which the bar 24 engages when the parts are positioned as in Figure 5. A tension spring 18 attached to the front end of bar 15 serves to urge it into engagement with bar 24. A bracket 106 is attached to the draw bar frame and forms an anchor for the front end of spring 22 whose rear end is attached to the rake head frame section. Spring 23 has one end attached to the rake head section and the other end to the draw bar frame as shown in Figures 3 and 5. Springs 22 and 23 exert oppositely acting torque forces on the frames. A dump bar 19 is mounted on pivot 20 and has its lower end resting on bar 15 as shown in Figure 5. When bar 19 is rocked counter-clockwise from the position shown in Figure 5 it moves bar 15 downwardly and engages bar 24 whereupon further movement tilts all of the rake head frames to the position shown in Figure 3 which movement raises the rake tines and dumps the hay. A dump rope R is attached to the upper end of dump lever 19 and when tension is released on this rope after the dumping operation the weight of the rake assembly will return the rake head frames to the position shown in Figure 2.

Figure 2:
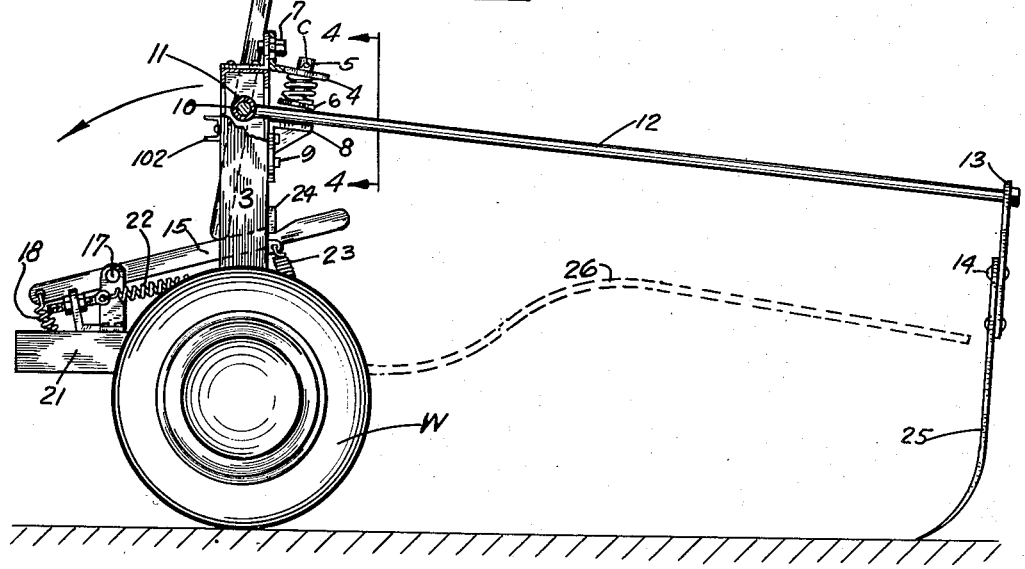
Figure 2 is an end elevation looking in the direction of arrows 2—2 in Figure 1, parts being broken away to better disclose the construction.

Referring now more particularly to Figures 2 and 3 which show the rake tine assembly in a ground engaging or operative position and in dumping position respectively. When the rake is in dumping position the rake tine assembly pull bars 12 rest on the upper surface of plate 8 which limits its downward movement. When the parts are returned to the operative position shown in Fig. 2 and before the rake is moved to gather a load of hay the parts are in the full line position. As the rake moves forwardly and gathers a load the increased pull rocks the rake head frame clockwise against the action of spring 22 thereby moving plate 3 downwardly and at the same time plate 6 is urged against the top of bars 12 forcing the tines into engagement with the ground with increased force. The heavier the load is to pull the greater the downwardly urging force becomes.

From the above description taken in connection with the drawing it will be seen that the machine to which this invention relates is a decided departure from present practice particularly in this that it is made up from a number of identical sections of simple but rugged construction which are treaded onto the supporting shaft. The rake can be made in any widths which are multiples of the widths of the sections. It is practical to accept and fill orders for rakes of any size or width because to fill such orders involves merely the selection of proper length axles. The rake tines are readily removable and when made from proper spring steel will seldom break but if one does break it can be quickly replaced. The rake tines can be spaced so as to produce the best results. Although there appears to be no need of providing cleaning rods these may be provided as indicated by broken lines and designated by numeral 26.

Having described the invention what is claimed as new is:

1. A hay rake comprising a wheel supported axle, a pull frame attached to the axle, at least one rake head frame supported by the axle, said rake head frame having two spaced vertical frame members supported at their lower ends by the axle, a bar connecting the upper ends of said members, the rake head frame being rockable about the axis of the axle with respect to the pull frame, means comprising a notched lever pivotally connected with the pull frame and operatively associated with the rake head frame, for latching it in a fixed rotarial position relative thereto, a pivot bar extending between the vertical frame members, a rake tine assembly comprising a tubular bearing positioned over the pivot bar, a flat bar having a plurality of parallel tines extending downwardly from one edge thereof, and pull rods connecting the ends of the tubular bearing with the ends of the tine carrying bar, means comprising a plate adjustably attached to said vertical head frame members underneath the pull rods, forming means for limiting the rotation of the rake tine assembly in a downward direction relative to the rake head frame means, comprising a plate resiliently connected with the rake head frame and positioned above the pull rods for limiting the rotary movement of the rake tine assembly in an upward direction, a latch release means comprising a lever pivoted to the rake head frame in operative engagement with the notched lever for releasing the same, and for rocking the rake head and the rake tine assembly to dumping position when a forwardly acting force is applied to the upper end of the latch release lever.

2. A device in accordance with claim 1 in which there are a plurality of rake head frames and rake tine assemblies positioned on the axle and interconnected to rock on the axle as a unit.

3. A device in accordance with claim 1 in which the rake head frame is biased to a predetermined rotary position relative to the pull frame by oppositely acting springs.

4. A rake assembly unit for use in forming rakes of variable widths, comprising, a rake head frame for use in an upwardly ranging position, having spaced parallel frame members provided at their lower ends with means for effecting a rockable connection with a rake axle and connected at their upper ends by a bar, a pivot rod extending between the frame members at a point below the bar, a tubular bearing encircling the pivot bar, a rake tine assembly, pull bars connecting the ends of the rake tine assembly with the ends of the tubular bearing whereby the rake tine assembly may move angularly with respect to the rake head frame and means for limiting said angular movement, comprising a flanged bar secured to the rake head frame below the pull bars and a resiliently mounted plate positioned above the pull bars.

CHARLES L. KELLY.

References Cited in the file of this patent

UNITED STATES PATENTS

| Number | Name | Date |
|---|---|---|
| 2,573,054 | Pearson | Oct. 30, 1951 |